United States Patent
Chan et al.

(10) Patent No.: US 9,078,170 B2
(45) Date of Patent: Jul. 7, 2015

(54) SYSTEM AND METHOD FOR NETWORK DISCOVERY

(71) Applicants: FutureWei Technologies, Inc., Plano, TX (US); ELECTRONICS AND TELECOMMUNICATIONS RESEARCH INSTITUTE, Daejeon (KR)

(72) Inventors: Hinghung Anthony Chan, Plano, TX (US); Hyunho Park, Daejeon (KR); JungHoon Jee, Daejeon (KR)

(73) Assignees: Futurewei Technologies, Inc., Plano, TX (US); Electronics and Telecommunications Research Institute, Daejeon (KR)

( * ) Notice: Subject to any disclaimer, the term of this patent is extended or adjusted under 35 U.S.C. 154(b) by 83 days.

(21) Appl. No.: 13/744,605

(22) Filed: Jan. 18, 2013

(65) Prior Publication Data

US 2013/0183966 A1 Jul. 18, 2013

Related U.S. Application Data

(60) Provisional application No. 61/587,933, filed on Jan. 18, 2012.

(51) Int. Cl.
*H04W 36/00* (2009.01)

(52) U.S. Cl.
CPC .......... *H04W 36/00* (2013.01); *H04W 36/0083* (2013.01)

(58) Field of Classification Search
CPC ..... H04W 48/16; H04W 48/18; H04W 48/20; H04W 88/06

USPC .............................................. 455/434, 435.2
See application file for complete search history.

(56) References Cited

U.S. PATENT DOCUMENTS

| | | | | |
|---|---|---|---|---|
| 6,119,003 | A * | 9/2000 | Kukkohovi | 455/435.2 |
| 6,400,948 | B1 * | 6/2002 | Hardin | 455/434 |
| 7,139,570 | B2 * | 11/2006 | Elkarat et al. | 455/432.3 |
| 7,184,768 | B2 * | 2/2007 | Hind et al. | 455/435.3 |
| 7,197,312 | B2 * | 3/2007 | Gunaratnam et al. | 455/445 |
| 7,292,592 | B2 * | 11/2007 | Rune | 370/401 |
| 7,644,061 | B1 | 1/2010 | Fallis et al. | |
| 2005/0090248 | A1 * | 4/2005 | Shen et al. | 455/432.1 |
| 2007/0230420 | A1 * | 10/2007 | Bumiller et al. | 370/338 |
| 2008/0165738 | A1 | 7/2008 | Barber | |
| 2011/0275369 | A1 * | 11/2011 | Bartlett et al. | 455/433 |

OTHER PUBLICATIONS

International Search Report and Written Opinion of Patent Cooperation Treaty (PCT), International Application No. PCT/US13/22195, Applicant Futurewei Technologies, Inc., date of mailing Apr. 5, 2013, 8 pages.

(Continued)

*Primary Examiner* — Temica M Beamer
(74) *Attorney, Agent, or Firm* — Slater & Matsil, L.L.P.

(57) ABSTRACT

A method for establishing a network connection includes determining a list of access networks detectable by a user equipment, and reducing the list of access networks to a list of preferred networks in accordance with supplemental information associated with the user equipment. The method also includes selecting a first candidate network from the list of preferred networks, and attempting to connect to the first candidate network.

17 Claims, 5 Drawing Sheets

(56) References Cited

OTHER PUBLICATIONS

Lim, W., et al., "Efficient WLAN Discovery Schemes Based on IEEE 802.21 MIH Services in Heterogeneous Wireless Networks," Global Telecommunications Conference, IEEE GLOBECOM 2008, IEEE Conference Publications, 2008, pp. 1-5.

Izumikawa, H., et al., "Novel WLAN Coverage Area Estimation Leveraging Transition of Cellular Signal using Multi-mode Mobile Terminal for Heterogeneous," Wireless Communications and Networking Conference, IEEE Conference Publications, 2009, pp. 1-6.

* cited by examiner

SYSTEM AND METHOD FOR NETWORK DISCOVERY

This application claims the benefit of U.S. Provisional Application No. 61/587,933, filed on Jan. 18, 2012, entitled "Methods and Systems for Network Discovery with User Interface," which application is hereby incorporated herein by reference.

TECHNICAL FIELD

The present disclosure relates generally to digital communications, and more particularly to a system and method for network discovery.

BACKGROUND

Network standards organizations such as WiMAX Forum and 3GPP have both been investigating single radio handover from/to their networks. The IEEE 802.21c Task Group also is working on single radio handover standard. Generally, the advantages of single radio handover are reduced peak transmission power requirement and less sophisticated signal filtering of the source/target receiver radio from the target/source transmission radio, resulting in lower cost of the multiple radio device.

In a single radio handover, since the device (also commonly referred to a user equipment, mobile station, mobile node, subscriber, user, terminal, and the like) is using a single radio, it is not free to use the radio tuned to the target radio network when the radio is tuned to the source radio network. Therefore, the source radio network is the only reliable means to transmit/receive. It is then necessary to perform as many functions as possible for making the handover using the source radio network prior to handover. One such function is the discovery of available networks. Generally, without using the target radio network, location information of the user equipment alone may be used to determine the candidate target network(s) for handover.

SUMMARY OF THE DISCLOSURE

Example embodiments of the present disclosure which provide a system and method for network discovery.

In accordance with an example embodiment of the present disclosure, a method for establishing a network connection is provided. The method includes determining, by a user equipment, a list of access networks detectable by the user equipment, and reducing, by the user equipment, the list of access networks to a list of preferred networks in accordance with supplemental information associated with the user equipment. The method also includes selecting, by the user equipment, a first candidate network from the list of preferred networks, and attempting, by the user equipment, to connect to the first candidate network.

In accordance with another example embodiment of the present disclosure, a method for operating a user equipment is provided. The method includes finding, by the user equipment, an available network in a range of radio channels, and determining, by the user equipment, supplemental information associated with the user equipment. The method also includes storing, by the user equipment, associated information about the available network and the supplemental information.

In accordance with another example embodiment of the present disclosure, a user equipment is provided. The user equipment includes a processor. The processor determines a list of access networks detectable by the user equipment, reduces the list of access networks to a list of preferred networks in accordance with supplemental information associated with the user equipment, selects a first candidate network from the list of preferred networks, and attempts to connect to the first candidate network.

One advantage of an embodiment is that supplemental information is used to reduce a number of access networks that a user equipment scans to perform network discovery. Reducing the number of access networks that are scan helps to reduce power consumption, network discovery time, and the like.

A further advantage of an embodiment is that the use of supplemental information helps to improve the probability of success rate for handovers since the number of access networks is reduced.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to network discovery. For example, at a user equipment, the user equipment determines a list of access networks detectable by the user equipment, and reduces the list of access networks to a list of preferred networks in accordance with supplemental information associated with the user equipment. The user equipment also selects a first candidate network from the list of preferred networks, and attempts to connect to the first candidate network. As another example, at a user equipment, the user equipment finds an available network in a range of radio channels, and determines supplemental information associated with the user equipment. The user equipment also stores information about the available network and the supplemental information.

The present disclosure will be described with respect to example embodiments in a specific context, namely a wireless communications system with user equipment utilizing network discovery. The disclosure may be applied to both standards compliant and non-standards compliant wireless communications systems.

Typically, a user equipment needs to know which access networks are available so that it knows which access network to connect to or to handover to. Utilizing a blind scan with its radio(s) consumes energy and incurs an extended delay. Furthermore, in some situations, such as in a single radio handover, the user equipment may not be able to tune to the target radio network to assist in setting up the handover, which may result in a lower probability of handover success.

Location information of the user equipment may be used to determine candidate access networks. As an example, the global positioning system (GPS) may be used to determine the location of the user equipment, which may be used to enhance network discovery. As an example, an information repository may be implemented in the wireless communications system and when paired with location information, can provide the user equipment with candidate access networks.

Figure 1:
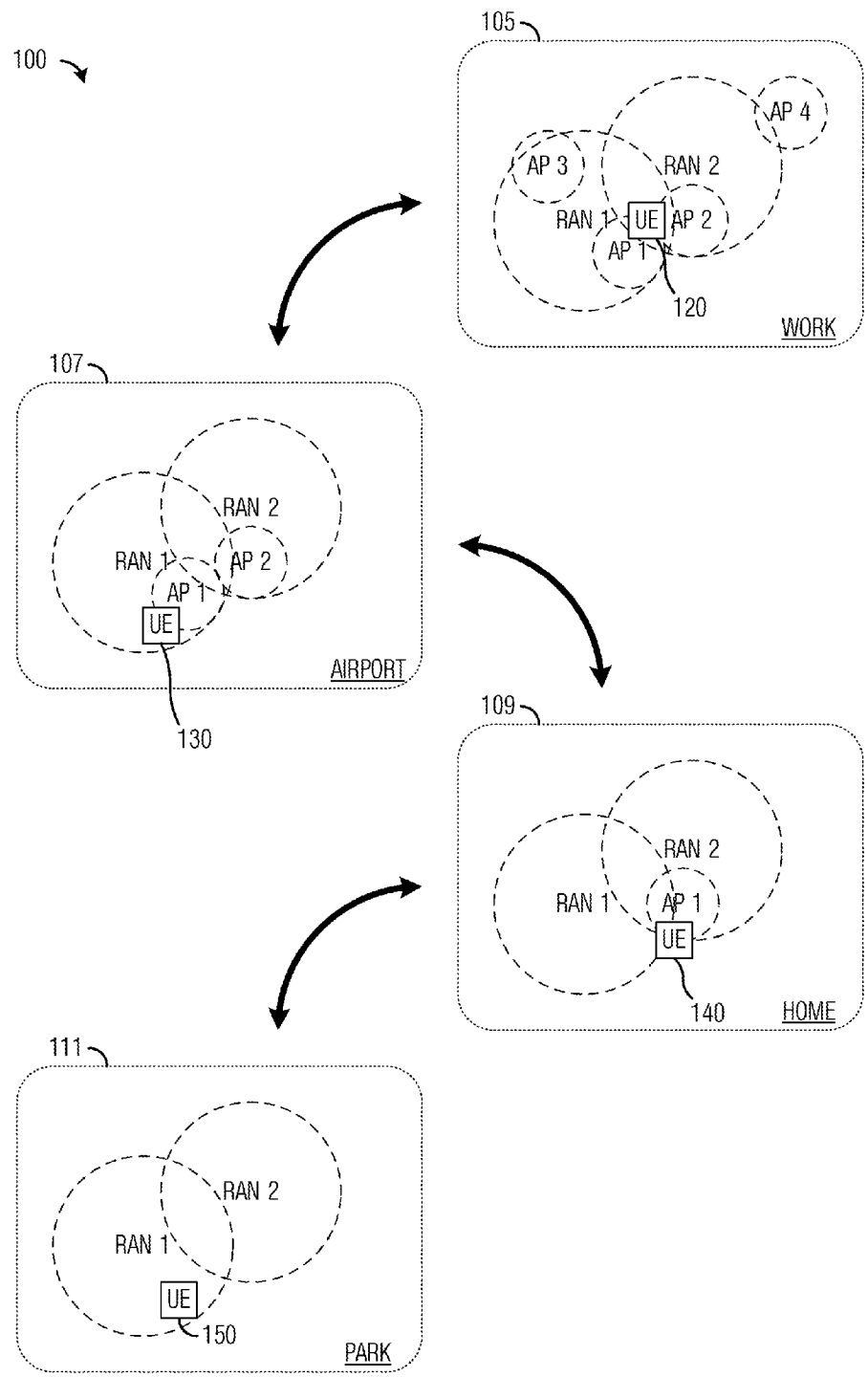
FIG. 1 illustrates an example wireless communications system according to example embodiments described herein.

FIG. 1 illustrates a wireless communications system 100. Wireless communications system 100 includes a plurality of access networks that provide access to user equipment. For illustrative purposes, some of the plurality of access networks is partitioned. A first partition 105 comprises access networks detectable by user equipment (UE) 120 while an operator of UE 120 is at work. First partition 105 includes two radio access networks (RANs) and a plurality of access points. Depending on a location of UE 120 within first partition 105, UE 120 may be able to detect some or all of the access networks. A second partition 107 comprises access networks detectable by UE 130 while an operator of UE 130 is at an airport. Similarly, third partition 109 comprises access networks detectable by UE 140 while an operator of UE 140 is at home and fourth partition 111 comprises access networks detectable by UE 150 while an operator of UE 150 is at a park. It is noted that the four partitions of wireless communications system 100 are intended for illustrative purposes only and are not intended to be limiting to either the scope or the spirit of the example embodiments. While it is understood that wireless communications systems may employ multiple access networks capable of communicating with a number of UEs, only a limited number of access networks and UEs are illustrated for simplicity.

As discussed previously, the location of a user equipment may be used to help determine the candidate access networks, thereby improving network discovery by reducing power consumption, scanning time, and the like. However, supplemental information about the user equipment and/or the operator of the user equipment may also be used to help additionally refine and reduce the number of candidate access networks and further reduce power consumption, scanning time, and the like. Examples of supplemental information about the user equipment may include day of the week information, time of the day information, scheduling information, historical information, location information, security information, and the like. It is noted that historical information may include record of prior network access.

As an illustrative example, day of the week information may include information such as Monday, Tuesday, Wednesday, Thursday, Friday, Saturday, and Sunday. Day of the week information may also include workday or weekend. As another illustrative example, time of the day information may include an actual time value, such as 9 am, 2 pm, and the like. Time of the day information may also include information associated with times, such as lunch time, break time, commute time. As another illustrative example, scheduling information may include information such as vacation time, vacation date(s), vacation location, appointment date, appointment time, appointment location, and the like. As another illustrative example, historical information may include information associated with a prior connection to an access network, including connection date, connection time, connection duration, access network identifying information, and the like. As another illustrative example, security information may include information related to an access network(s), including access network identifying information, access network security key(s), access network location information, and the like.

As an illustrative example, consider a situation where the operator of the user equipment has a typical 9 to 5 work schedule. Therefore, between 9 am to 5 pm on workdays, the operator (and therefore, the user equipment) is going to be at work. Since the user equipment is at work, it is not likely to be able to detect access networks that it can detect when it is at the operator's home. Therefore, the supplemental information (e.g., scheduling information, time of the day information, day of the week information, security information, and historical information) may be used to eliminate at least some of access networks from the candidate access networks. Similarly, if the operator has a scheduled doctor's appointment from 10 am to 11 am on Tuesday, then at the time of the doctor's appointment, the user equipment is not likely to be able to detect access networks that it can detect when it is at the operator's work place or at home. Hence, the supplemental information (e.g., scheduling information, time of the day information, day of the week information, security information, and historical information) may be used to eliminate at least some of access networks from the candidate access networks.

According to an example embodiment, the use of supplemental information finds candidate access networks for a user equipment to use 1) before knowing which radio to use, 2) when the radio is deactivated, or 3) when it is desirable to avoid a blind scan of spectrum by the user equipment.

According to an example embodiment, supplemental information (such as day of the week information, time of the day information, scheduling information, historical information, location, security information, and the like) is used to determine what access networks are available for a user equipment to connect to. The supplemental information may include day, date, time, operator location with expected support at the location, network access information, and the like. The network access information may include each candidate access network, its technology (e.g., WLAN, LTE, UMTS, WiMAX, and the like), frequency band(s) of operation, security information, record of prior access, and the like.

According to an example embodiment, supplemental information (such as day of the week information, time of the day information, scheduling information, historical information, location, security information, and the like) is used assist in performing single radio handovers. In other words, the reduction in the number of access networks that the user equipment may perform the handover with shortens latency involved in performing the single radio handover, which helps to improve the probability of success and shortens potential service interruption. The ability to use a single radio in a handover may allow for the use of lower cost user equipment (i.e., those with a single radio) rather than higher cost user equipment with multiple radios that are capable of performing multiple radio handovers.

The use of single radio handovers also provide for cost and peak power consumption reductions in cellular-based communications systems, such as those that are 3GPP and WiMAX standards compliant, with significant cost reduction seen in lower peak power consumption and simpler radio filter design. The example embodiments described herein may be applicable to multiple interface user equipment and heterogeneous networks. As an example, the multiple interfaces may be operable with 3GPP, WiMAX, 3GPP2, WLAN, and the like, technical standards as well as non-standards based interfaces. Such user equipment may implement the example embodiments in core network functions to support single radio handovers.

According to an example embodiment, the supplemental information may also be used to discover candidate access networks prior to activation (tuning) of a radio for the target radio network in a multiple radio handover. According to an example embodiment, the supplemental information may also be used to discover candidate access networks prior to activation (tuning) of a radio for the target radio network in a multiple radio handover and/or an attachment procedure while avoiding a blind scan of the spectrum. According to an example embodiment, the supplemental information may also be used to discover candidate access networks when a user equipment with multiple radios is not able to activate (tune) to the target radio network (i.e., in a single radio handover situation).

As an illustrative example, a multiple radio user equipment accesses different access networks with different network technologies by using a different radio interface for each network technology. Utilizing each of its radios to determine which radio networks can be used may be time and energy consuming. The supplemental information may be used to assist finding the access network to use by reducing the number of candidate access networks. The supplemental information may include day of the week information, time of the day information, scheduling information, historical information, location, security information, and the like.

As another illustrative example, a multiple radio user equipment accesses different access networks to determine which one(s) is available when the multiple radio user equipment is performing a handover, such as when the multiple radio user equipment has an existing connection that is fading. Using each of its radios to determine which radio(s) may be used to tune to their respective access networks is time and energy consuming, so the supplemental information may be used to find the access network. The supplemental information may include day of the week information, time of the day information, scheduling information, historical information, location, security information, and the like.

As another illustrative example, in a single radio handover, the user equipment is generally not free to use the target radio network while its radio is tuned to the source radio network. Therefore, the source radio network is the only reliable means to transmit and/or receive. Hence, as many handover facilitating functions as possible are made using the radio tuned to the source radio network before the radio is tuned to the target radio network. One such function is network discovery. While the radio is tuned to the source radio network, the user equipment does not know which access networks are available and does not know which radio interface to use. Furthermore, prior to performing the handover, the radio is no longer tuned to the source radio network, so if too much time is taken to determine which target radio network to use, the handover may fail or a significant service break occurs. The supplemental information may be used to reduce the number of target radio networks in network discovery. The supplemental information may include day of the week information, time of the day information, scheduling information, historical information, location, security information, and the like.

As another illustrative example, when a user equipment is turned on, it typically scans through the spectrum (e.g., a number of radio channels) to search for available access networks. Such a search is slow (on the order of multiple seconds) and consumes a lot of battery power. The supplemental information may be used to guide the search so that the user equipment can find the available access networks more rapidly while avoiding consuming limited battery power. The supplemental information may include day of the week information, time of the day information, scheduling information, historical information, location, security information, and the like.

According to an example embodiment, a user equipment may include a scheduling program or application through which they manage their schedule (e.g., appointments, meetings, trips, vacations, and the like). The information in the scheduling program or application may be used as supplemental information. According to an example embodiment, a user equipment may include a locating system, or a positioning program or application (such as GPS) to provide location information about the user equipment. The location information may be used as supplemental information. An example of time and location information includes: TIME—9 am to 11 am; LOCATION—meeting room 1; and GPS coordinates.

According to an example embodiment, network discovery may be user equipment centric. If the user equipment knows the access network information, it can attempt to connect to the access network using the access network information.

Figure 2:
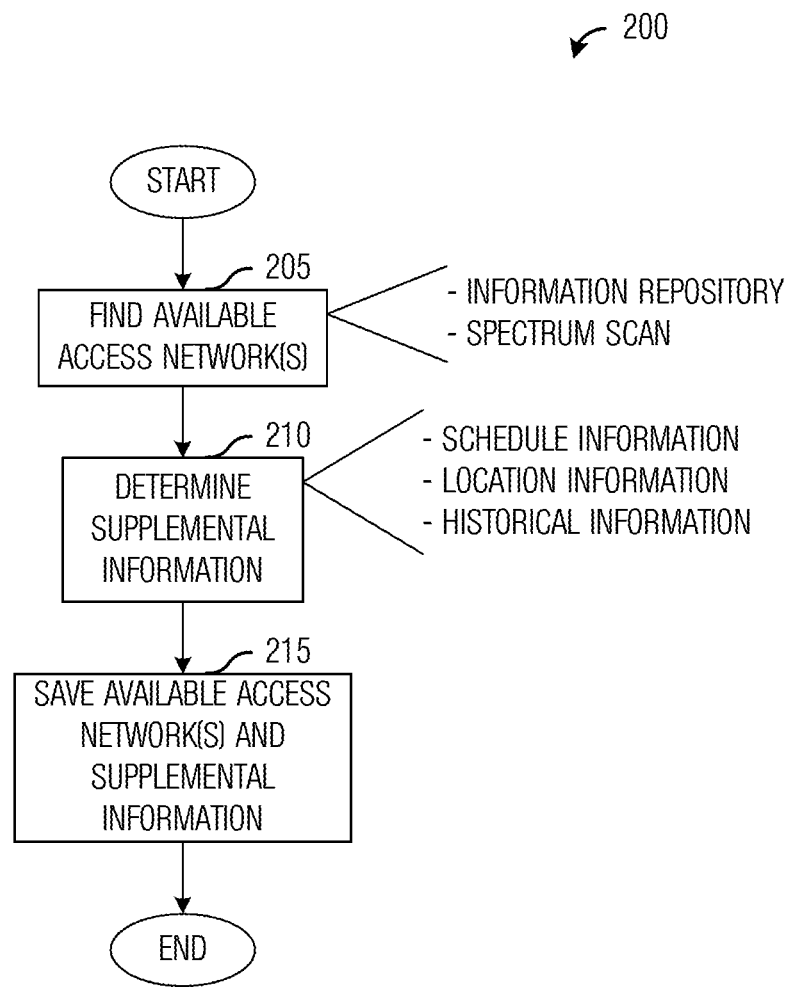
FIG. 2 illustrates an example flow diagram of operations in generating and saving access network information according to example embodiments described herein.

FIG. 2 illustrates a flow diagram of operations 200 in generating and saving access network information. Operations 200 may be indicative of operations occurring in a user equipment as the user equipment generates and saves access network information.

Operations 200 may begin with the user equipment finding available access networks (block 205). According to an example embodiment, finding available access networks may include the user equipment performing a scan of the spectrum (i.e., a plurality of radio channels) to find available access networks. In other words, the available access networks may be access networks that the user equipment is capable of detecting at its current location. According to an example embodiment, finding available access networks may include the user equipment accessing an information repository to retrieve a list of available access networks. The user equipment may provide its location information to the information repository to obtain the available access networks that it is capable of detecting. The user equipment may attempt to access the access networks to determine if it is actually capable of accessing the access networks. As an illustrative example, one or more of the access networks may not allow the user equipment access. For example, the operator of the user equipment may not have an account with an operator of the access network. As another example, the operator may not have sufficient security clearance to use the access network.

The user equipment may determine supplemental information (block 210). According to an example embodiment, the user equipment may determine day of the week information, time of the day information, scheduling information, historical information, location, security information, and the like, and associate the supplemental information with the available access networks. The supplemental information may be obtained from the user equipment and programs and/or applications executing therein. The supplemental information may also be retrieved from a server. As an example, the user equipment may obtain security information and/or historical information from one or more servers.

The user equipment may save the available access networks (or information thereof) and the supplemental information (block 215). According to an example embodiment, the available access networks and the supplemental information may be stored in a memory in the user equipment. As an illustrative example, the available access networks may be stored in the memory that is indexed in accordance with at least some of the supplemental information. Some of the supplemental information may also be stored with the available access networks. As an example, day of week, time of day, and location may be used to index the available access networks, which may be stored along with historical information and/or security information. According to an example embodiment, at least some of the available access networks and supplemental information may be stored in the information repository.

Figure 3:
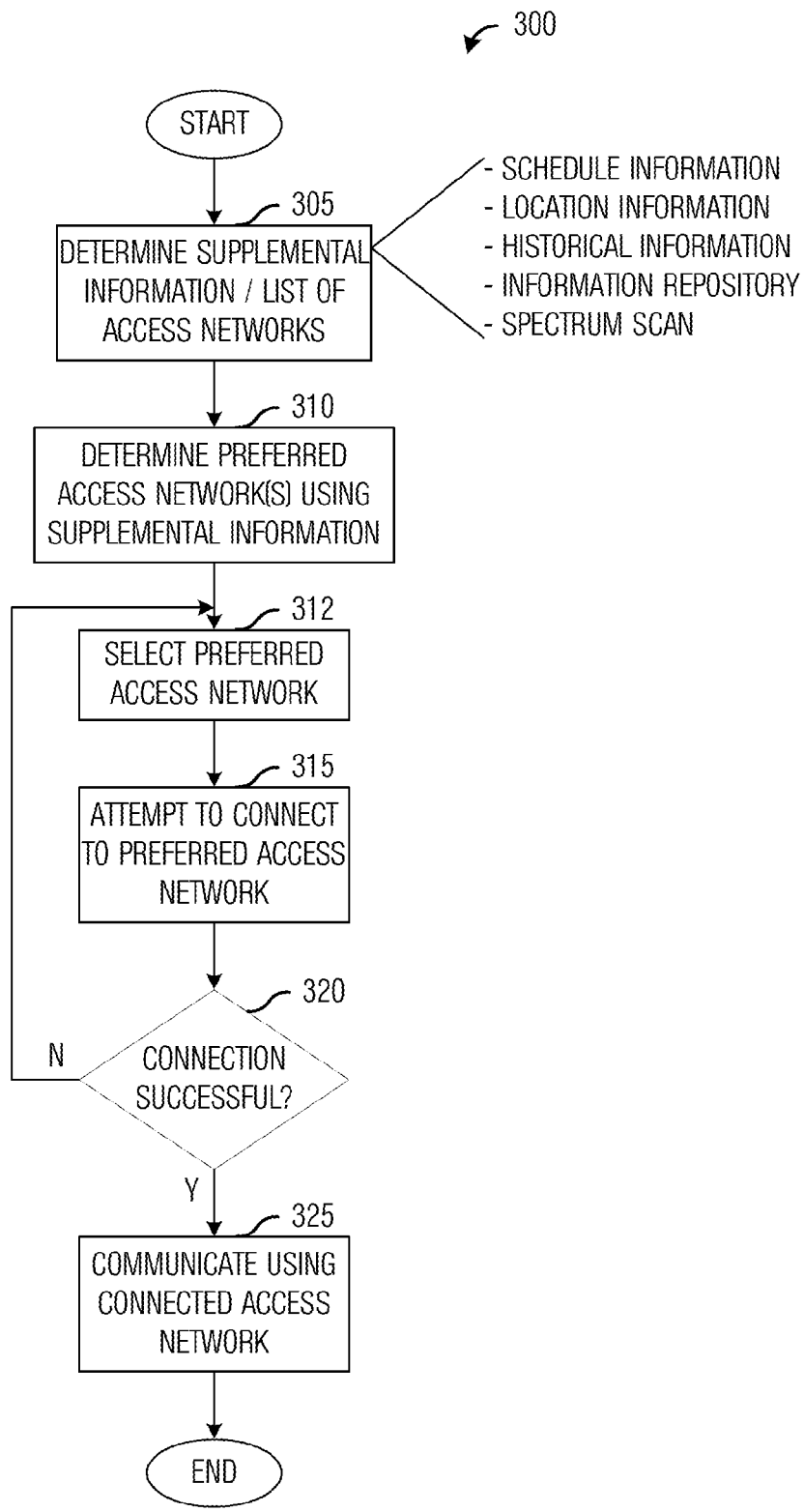
FIG. 3 illustrates an example flow diagram of operations in using supplemental information to assist network discovery and/or handover according to example embodiments described herein.

FIG. 3 illustrates a flow diagram of operations 300 in using supplemental information to assist network discovery and/or handover. Operations 300 may be indicative of operations occurring in a user equipment as the user equipment uses supplemental information to assist network discovery and/or handover.

Operations 300 may begin with the user equipment determining supplemental information and a list of access networks (block 305). According to an example embodiment, the supplemental information may be obtained from the user equipment and programs and/or applications executing therein (e.g., a memory of the user equipment used by programs and/or applications to store the supplemental information). The supplemental information may also be retrieved from a server. The supplemental information may include day of the week information, time of the day information, scheduling information, historical information, location, security information, and the like. As an example, the user equipment may obtain security information and/or historical information from one or more servers. The list of access networks may be networks that are detectable by the user equipment at its current location. According to an example embodiment, the list of access networks may be retrieved from a memory of the user equipment or a server in the wireless communications. According to another example embodiment, the list of access networks may be determined in a scan of spectrum by the user equipment.

The user equipment may determine a list of preferred access networks from the list of access networks using the supplemental information (block 310). According to an example embodiment, the user equipment may use the supplemental information to reduce the list of access networks to generate the list of preferred access networks. As an example, the user equipment may use day of the week, date, and/or location information of the supplemental information to eliminate some access networks from the list of access networks. Furthermore, the user equipment may use security information to further eliminate other access networks. The reduced list of access networks may become the list of preferred access networks that the user equipment scans to perform network discovery and/or perform a handover.

The user equipment may select an access network from the list of preferred access networks (block 312). The user equipment may attempt to connect to the selected access network in the list of preferred access networks (block 315). According to an example embodiment, the user equipment may have a preference in which access networks it attempts to connect to. As an illustrative example, the user equipment may prefer to connect to free access networks first and then move on to subscription access networks. Alternatively, the user equipment may prefer to connect to access networks in accordance to the services that they are capable of providing, data rates that they are capable of providing, error rates of the access networks, number of subscribers in the access networks, and the like.

The user equipment may perform a check to determine if the connection attempt succeeded (block 320). If the connection attempt succeeded, the user equipment may being to communicate using the access network (block 325). However, if the connection attempt failed, the user equipment may return to block 315 to attempt to connect to another access network in the list of preferred access networks. If there are no more access networks in the list of preferred access networks, the user equipment may perform a scan of the spectrum, repeat operations 300, wait a specified amount of time before performing the scan of the spectrum, repeating operations 300, or simply quit.

According to an example embodiment, network discovery may be network centric and is supplemented by an information repository that includes access network information. Network discovery may be achieved through the use of the information repository in combination with the supplemental information (such as time and/or location of the user equipment), which may or may not include GPS information.

According to an example embodiment, network discovery may be enhanced with records of the user equipment's network access with or without the availability of the information repository. As an illustrative example, an operator has visited a first location and accessed a WLAN access network at a specific time. Then, when the operator visits the first location again, the records of the network access will show that the operator's user equipment can connect to the WLAN access network using the stored network access information.

Figure 4:
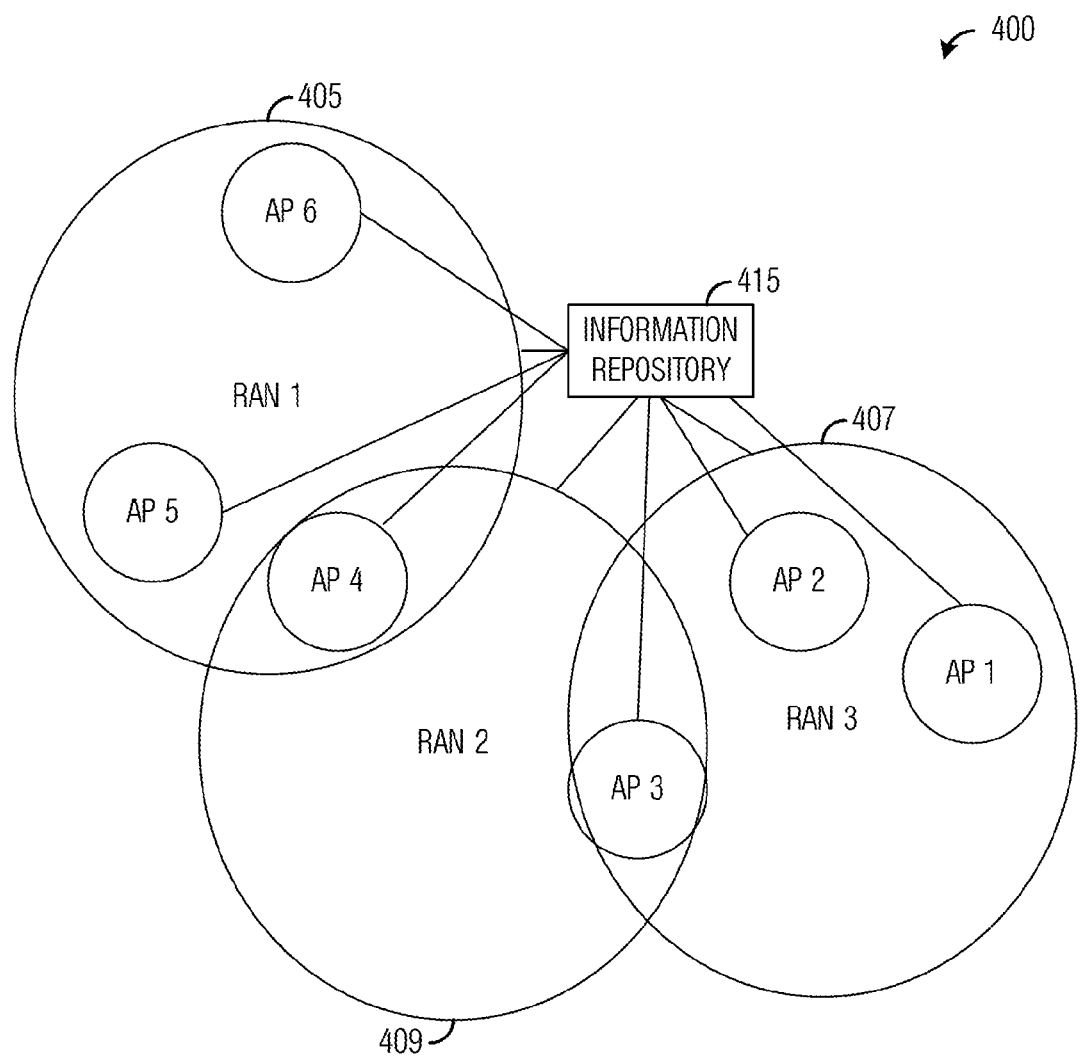
FIG. 4 illustrates an example wireless communications system with an information repository according to example embodiments described herein.

FIG. 4 illustrates a wireless communications system 400 with an information repository. Wireless communications system 400 includes a plurality of access networks, including a plurality of RANs, such as RANs 405-407, and a plurality of access points. Wireless communications system 400 also includes an information repository 415, which may be used to store information such as access network information as well as some forms of supplemental information. As an example, information repository 415 may store access network information indexed according to location. Furthermore information repository 415 may store supplemental information such as security information, historical information, and the like.

Information repository 415 may be accessible by elements of RANs and APs, as well as user equipment coupled to the RANs and APs. As an example, information repository 415 may be coupled over a wireless or wireline connection to elements of RANs and APs, while user equipment may be coupled wirelessly to elements of RANs and APs, which are in turn coupled to information repository 415.

Figure 5:
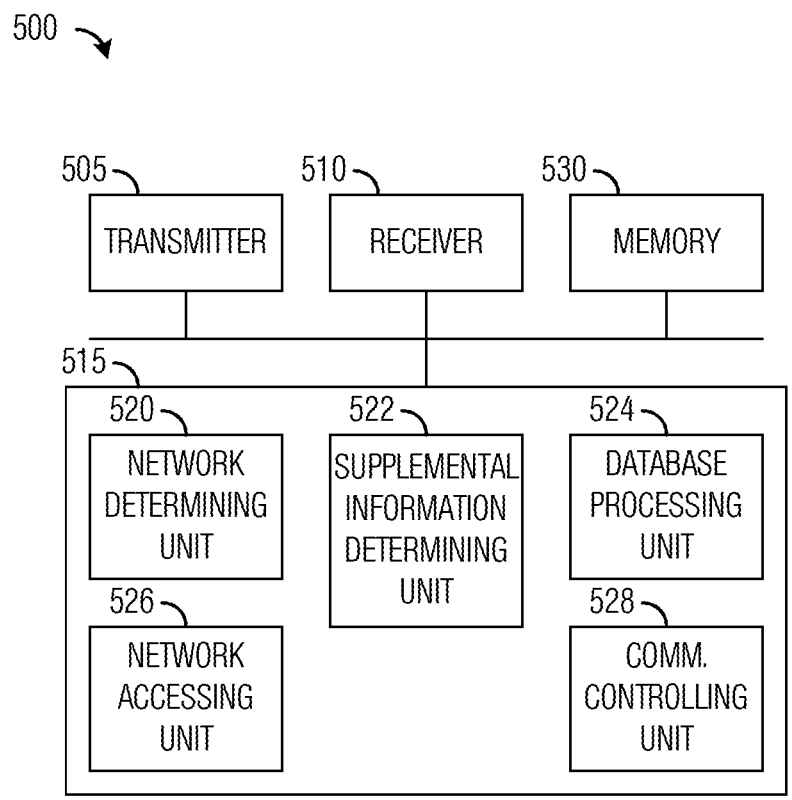
FIG. 5 illustrates an example communications device according to example embodiments described herein.

FIG. 5 provides an illustration of a communications device 500. Communications device 500 may be an implementation of a device, such as a user equipment, a mobile station, a terminal, a user, a subscriber, and the like. Communications device 500 may be used to implement various ones of the embodiments discussed herein. As shown in FIG. 5, a transmitter 505 is configured to send packets and/or signals and a receiver 510 is configured to receive packets and/or signals. Transmitter 505 and receiver 510 may have a wireless interface, a wireline interface, or a combination thereof.

A network determining unit 520 is configured to determine a list of access networks. Network determining unit 520 is configured to perform a scan of spectrum and/or access an information depository to determine the list of access networks. A supplemental information determining unit 522 is configured to determine supplemental information for communications device 500. Supplemental information determining unit 522 accesses programs and/or applications in communications device 500 to obtain supplemental information, such as day of the week information, time of the day information, scheduling information, historical information, location, security information, and the like. A database processing unit 524 is configured to store and/or retrieve the list of access networks and/or supplemental information stored in a memory and/or an information repository. A network accessing unit 526 is configured to connect to an access network. A communications controlling unit 528 is configured to control information sent to an access network and/or information received from an access network. A memory 1430 is configured to store the list of access networks, supplemental information, access network information, and the like.

The elements of communications device 500 may be implemented as specific hardware logic blocks. In an alternative, the elements of communications device 500 may be implemented as software executing in a processor, controller, application specific integrated circuit, or so on. In yet another alternative, the elements of communications device 500 may be implemented as a combination of software and/or hardware.

As an example, transmitter 505 and receiver 510 may be implemented as a specific hardware block, while network determining unit 520, supplemental information determining unit 522, database processing unit 524, network accessing unit 526, and communications controlling unit 528 may be software modules executing in a processor 515, a microprocessor, a custom circuit, or a custom compiled logic array of a field programmable logic array. Network determining unit 520, supplemental information determining unit 522, database processing unit 524, network accessing unit 526, and communications controlling unit 528 may be stored as modules in memory 530.

Although the present disclosure and its advantages have been described in detail, it should be understood that various changes, substitutions and alterations can be made herein without departing from the spirit and scope of the disclosure as defined by the appended claims.

What is claimed is:

1. A method for establishing a network connection, the method comprising:
    determining, by a user equipment, a list of access networks detectable by the user equipment;
    retrieving supplemental information associated with the user equipment from a scheduling program for managing a user's scheduled appointments, wherein the supplemental information comprises:
        appointment date;
        appointment time; and
        appointment location;
    reducing, by the user equipment, the list of access networks to a list of preferred networks in accordance with the supplemental information;
    selecting, by the user equipment, a first candidate network from the list of preferred networks; and
    attempting, by the user equipment, to connect to the first candidate network.

2. The method of claim 1, wherein determining the list of access networks comprises at least one of scanning a spectrum to generate the list of access networks, and retrieving the list of access networks from an information repository.

3. The method of claim 1, further comprising retrieving the list of access networks from a memory.

4. The method of claim 1, further comprising retrieving the supplemental information from a memory.

5. The method of claim 1, further comprising storing the list of access networks and the supplemental information in a memory.

6. The method of claim 5, wherein the list of access networks is indexed in accordance with the supplemental information.

7. The method of claim 1, further comprising:
    selecting a second candidate network from the list of preferred networks, and
    attempting to connect to the second candidate network if the user equipment failed to connect to the first candidate network.

8. The method of claim 1, wherein reducing the list of access networks comprises:
    selecting preferred networks from the list of access networks that are accessible by the user equipment in accordance with the supplemental information; and
    populating the list of preferred networks with the selected preferred networks.

9. A method for operating a user equipment, the method comprising:
    finding, by the user equipment, an available network in a range of radio channels;
    retrieving supplemental information from a scheduling program for managing a user's scheduled appointments, wherein the supplemental information comprises:
        appointment date;
        appointment time; and
        appointment location; and
    storing, by the user equipment, associated information about the available network and the supplemental information, wherein the available network is indexed in accordance with the supplemental information.

10. The method of claim 9, wherein finding the available network comprises scanning the range of radio channels.

11. The method of claim 9, wherein the associated information about the available network comprises an identifier of the available network.

12. A user equipment comprising:
    a processor configured to:
        determine a list of access networks detectable by the user equipment;
        retrieve supplemental information associated with the user equipment from a scheduling program for managing a user's scheduled appointments, wherein the supplemental information comprises:
            appointment date;
            appointment time; and
            appointment location;
        reduce the list of access networks to a list of preferred networks in accordance with the supplemental information;
        select a first candidate network from the list of preferred networks; and
        attempt to connect to the first candidate network.

13. The user equipment of claim 12, wherein the processor is configured to scan a spectrum to generate the list of access networks.

14. The user equipment of claim 12, wherein the processor is configured to retrieve the list of access networks from an information repository.

15. The user equipment of claim 12, wherein the processor is configured to store the list of access networks in a memory.

16. The user equipment of claim 12, wherein the processor is configured to select a second candidate network from the list of preferred networks, and to attempt to connect to the second candidate network if the user equipment failed to connect to the first candidate network.

17. The user equipment of claim 12, wherein the processor is configured to select preferred networks from the list of access networks that are accessible by the user equipment in accordance with the supplemental information, and to populate the list of preferred networks with the selected preferred networks.

* * * * *